(12) United States Patent
Orita (10) Patent No.: US 9,315,140 B2
(45) Date of Patent: Apr. 19, 2016

(54) WATER DISPENSER

(71) Applicant: Kabushiki Kaisha Cosmo Life, Hyogo (JP)

(72) Inventor: Yoshinori Orita, Hyogo (JP)

(73) Assignee: KABUSHIKI KAISHA COSMO LIFE, Hyogo (JP)

( * ) Notice: Subject to any disclaimer, the term of this patent is extended or adjusted under 35 U.S.C. 154(b) by 0 days.

(21) Appl. No.: 14/407,485

(22) PCT Filed: Apr. 23, 2013

(86) PCT No.: PCT/JP2013/061906
§ 371 (c)(1),
(2) Date: Dec. 12, 2014

(87) PCT Pub. No.: WO2013/187128
PCT Pub. Date: Dec. 19, 2013

(65) Prior Publication Data
US 2015/0165958 A1    Jun. 18, 2015

(30) Foreign Application Priority Data

Jun. 14, 2012   (JP) ................................ 2012-134887

(51) Int. Cl.
*B60P 3/22* (2006.01)
*B67D 3/00* (2006.01)
*B67D 1/07* (2006.01)
*B67D 1/00* (2006.01)
*A47B 88/04* (2006.01)
(Continued)

(52) U.S. Cl.
CPC ............. *B60P 3/224* (2013.01); *A47B 88/0485* (2013.01); *B67D 1/0004* (2013.01); *B67D 1/07* (2013.01);
(Continued)

(58) Field of Classification Search
CPC .......... B67D 3/00; B67D 1/07; B67D 1/0857; B67D 1/0895; B67D 1/0004; B67D 2210/00097; F25D 11/00; B60P 3/224
USPC ................ 222/160, 129.1, 146.1, 608, 611.1, 222/181.1, 181.2, 185.1
See application file for complete search history.

(56) References Cited

U.S. PATENT DOCUMENTS

| 3,949,902 A * | 4/1976 | Thompson ............... A47J 31/46 222/129.1 |
| 2010/0116847 A1* | 5/2010 | Foroughi ............. B67D 1/0004 222/81 |

(Continued)

FOREIGN PATENT DOCUMENTS

| JP | 56-161635 | 12/1981 |
| JP | 3055946 | 2/1999 |

(Continued)

OTHER PUBLICATIONS

International Search Report issued May 21, 2013 in International (PCT) Application No. PCT/JP2013/061906.

*Primary Examiner* — Donnell Long
(74) *Attorney, Agent, or Firm* — Wenderoth, Lind & Ponack, L.L.P.

(57) ABSTRACT

A water dispenser includes a drawer having a rear side provided in the lower portion of a casing and is guided by guiding portions fixed to the casing. Before the casing which stands on a floor surface topples down and before the drawer comes into contact with a floor surface, casters support the front side of the drawer. Normally, axles of the casters are supported on respective front side support portions such that the casters roll on a floor surface. The casters collide against a step, so that the axles are moved to rear side support portions which are located higher than the front side support portions.

8 Claims, 8 Drawing Sheets

(51) Int. Cl.
*B67D 7/84* (2010.01)
*B67D 1/08* (2006.01)

(52) U.S. Cl.
CPC .. *B67D 3/00* (2013.01); *B67D 7/84* (2013.01); *B67D 1/0857* (2013.01); *B67D 1/0895* (2013.01); *B67D 2210/00097* (2013.01)

(56) References Cited

U.S. PATENT DOCUMENTS

2010/0180606 A1* 7/2010 Gur .................. F25B 21/02
62/3.61

2011/0017776 A1* 1/2011 Metropulos .......... B67D 1/0888
222/129.1

FOREIGN PATENT DOCUMENTS

| | | |
|---|---|---|
| JP | 2001-019094 | 1/2001 |
| JP | 2001-153523 | 6/2001 |
| JP | 2007-238144 | 9/2007 |
| JP | 2010-143600 | 7/2010 |
| JP | 2010-235135 | 10/2010 |
| JP | 4802299 | 10/2011 |
| JP | 2012-106765 | 6/2012 |
| JP | 2012-171651 | 9/2012 |
| JP | 2012-171679 | 9/2012 |

* cited by examiner

WATER DISPENSER

TECHNICAL FIELD

The present invention relates to a water dispenser for supplying drinking water from a replaceable raw water container filled with drinking water such as mineral water.

BACKGROUND ART

Water dispensers were used mainly in offices and hospitals, etc. However, since the interest in the safety of water or in health is growing these days, the number of water dispensers used in ordinary homes is increasing. Such water dispensers are configured such that drinking water contained in a raw water container is sent to a temperature adjustment tank, and drinking water stored in the temperature adjustment tank is discharged into a cup, etc. by user's operation.

Since the volume of raw water containers is large, it is a big burden on the user to place a heavy and brand-new raw water container in the upper portion of a casing. In order to overcome this problem, a water dispenser is proposed in which a raw water container is mounted in the lower position of a casing, and in which drinking water contained in the raw water container is drawn up by a pump into a temperature adjustment tank. Such a water dispenser is provided with a carriage which can be moved into and out of the lower portion of the casing with the raw water container placed on the carriage so that the raw water container can be easily moved into and out of the lower portion of the casing (see Japanese Unexamined Patent Application Publication No. 2001-153523 (in particular, paragraphs [0021], [0022] and FIGS. 2, 3); and Japanese Patent No. 4802299 (in particular, FIGS. 6, 7)).).

In a water dispenser in which a carriage is used, in order to move a raw water container into and out of the lower portion of a casing, the user moves a carriage which has a container placing portion out of a casing, removes a raw water container which is no longer usable from the container placing portion, places a brand-new raw water container on the container placing portion, and pushes the carriage so as to move the brand-new raw water container into the casing. When such a water dispenser is used in ordinary homes in summer, the casing is placed on a floor surface with nothing placed on the floor surface in front of the casing in most cases. In this case, when the carriage is moved into and out of the casing, casters of the carriage roll on the floor surface on which the casing stands. However, if a carpet is placed on the floor surface in front of the casing in winter, the edge of the carpet forms a step relative the floor surface. It is difficult and inefficient for old people and women to move the carriage on which a heavy and brand-new raw water container is placed into and out of the casing such that the casters of the carriage roll off and roll on the carpet, while appropriately keeping the moving directions of the carriage.

SUMMARY OF THE INVENTION

In view of the above-described background, it is an object of the present invention to provide a water dispenser in which a raw water container can be easily moved into and out of the lower portion of a casing.

In order to achieve the above object, the present invention provides a water dispenser in which a drawer is provided in the lower portion of a casing so as to be slid into and out of the lower portion of the casing with a raw water container placed on the drawer. Since the rear side of the drawer is guided in the sliding-in and sliding-out directions by guiding portions fixed to the casing, it is not necessary for the user to determine the sliding-in and sliding-out directions of the drawer.

According to the present invention, since the sliding-in and sliding-out directions of the drawer are along a horizontal straight line, when a heavy and brand-new raw water container is placed on the drawer, the weight of the raw water container prevents the drawer from freely moving.

The sliding-in and sliding-out directions of the drawer are along a horizontal straight line, thereby enabling the rear side of the drawer to be vertically supported by the guiding portions. By designing the drawer such that the drawer is guided and supported by the guiding portions higher than an outer bottom surface (surface of the casing which comes into contact with a floor surface when the casing is placed on the floor surface) of the casing and thus the front side of the drawer never comes into contact with the floor surface, it is possible to prevent the floor surface from being damaged by the drawer. However, there is still the concern that if a heavy and brand-new raw water container is roughly placed on the drawer, the casing might tilt toward the front side thereof, and furthermore if the front side of the drawer comes into contact with the floor surface due to this tilt of the casing, an extremely large load might be applied to the guiding portions.

In order to remove the above concern, according to the present invention, supporting members are provided which can support on the floor surface the front side of the drawer though the guiding portions cannot support the front side thereof, and which are less likely to damage the floor surface. Namely, casters are attached onto the front side of the drawer.

The larger the guide gap exists in the vertical direction between the drawer and the guiding portions, the larger the allowable elevation and depression angles of the drawer become relative to the casing. As a result thereof, the guide and contact area (area in which the drawer is guided by and brought into contact with the guiding portions) becomes partially large so that a large stress is likely to occur, or the drawer is less likely to be smoothly slid into and out of the casing. Therefore, it is preferable that the above guide gap is defined to be made as small as possible. In this state, when the casing is placed on the floor surface such that the outer bottom surface of the casing comes into contact with the floor surface, if a carpet is placed on the floor surface in front of the casing, it is impossible to tilt the entire drawer and make the casters roll on and roll off the carpet, so that it is impossible to slide the drawer into and out of the lower portion of the casing. If the height of the casters rolling can be adjusted by the user, for example if axles of the casters can be selectively attached to several positions, or if the diameter of the casters can be changed, the water dispenser can be used even if there is a carpet.

However, when the water dispenser is used in ordinary homes, there is the concern that the user might forget to appropriately readjust the height of the casters after removing a carpet placed in winter. In this case, since the casters do not function as supporting members for preventing the casing from toppling down, it is not preferable to depend on the user in terms of readjusting the height of the casters.

In order to remove the above concern, the present invention provides a water dispenser which is configured such that casters can be attached without requiring the user's operations, and which can be used even if there is a carpet. Namely, the water dispenser is configured such that bearing surfaces which receive axles of the respective casters each comprises a front side support portion which supports the axle on the front side of the bearing surface, a rear side support portion which supports the axle on the rear side of the bearing surface, a path portion along which the axle is guided from the front side support portion to the rear side support portion, wherein when the axles are supported on the respective front side support portions, the casters are located at the same height as an outer bottom surface, wherein when the axles are supported on the respective rear side support portions, the casters are located higher than the outer bottom surface, and wherein when the drawer is slid out of the lower portion of the casing, the casters collide against an object in the sliding-out direction so that the axles are moved from the front side support portions to the rear side support portions. In the present invention, height means altitude from the horizontal plane containing the outer bottom surface. When the axles are supported on the respective front side support portions, the casters roll on the same floor surface with which the outer bottom surface of the casing are in contact, with the front side of the drawer supported on the floor surface through the casters. Therefore, under a general situation in which a carpet is not placed, as soon as a raw water container is placed on the drawer, the casters together with guiding portions support the drawer so as to prevent the casing from toppling down, and so as to alleviate the burden on the guiding portions. On the other hand, if a carpet is placed on the floor surface in front of the casing, the casters collide against the edge of the carpet when the drawer is slid out of the lower portion of the casing. When the casters collide against the edge thereof, the axles can be moved through the path portions to the rear side support portions. When the axles are supported on the rear side support portions, the casters can roll on surfaces higher than the outer bottom surface of the casing with the front side of the drawer supported through the casters on these surfaces. Therefore, as long as the thickness of a carpet corresponds to the difference between the height of the axle when the axle is at the front side support portion and the height of the axle when the axle is at the rear side support portion, the casters can be rolled onto a carpet with the front side of the drawer supported on the floor surface through the carpet. Therefore, when the raw water container is placed on the drawer, the casters together with the guiding portions finally support the drawer so as to prevent the casing from toppling down, and so as to prevent an excessive burden on the guiding portions. As described above, the water dispenser can be used even if there is a carpet without requiring the adjustment of the casters by the user, namely the casters surely function as supporting members.

According to the present invention, it is sufficient that if the casing tilts toward the front side of the casing by placing the raw water container on the drawer, the axles are supported on the respective rear side support portions so that the casters support the front side of the drawer, thereby making it possible to prevent the casing from toppling down. Since each path portion has a slant for leading the axle upwardly, when the casters support the drawer, it is difficult for each path portion to function as a portion which receives the load of the axle. It is sufficient that when the axles are pushed from above and supported on the respective front side support portions or at the respective rear side support portions, the casters can support the front side of the drawer.

If springs are provided which are configured to bias the respective axles toward the front side support portions while the axles are located at the path portions or the rear side support portions, even when the axles are in contact with the respective path portions, it is possible to support the front side of the drawer according to the strength of the springs.

While the raw water container which is no longer usable is moved out of the lower portion of the casing, it is not necessarily essential for the casters to support the front side of the drawer. At this time, in a situation in which the casters roll on the floor surface on which the casing stands, if the axles receiving light loads are easily moved through the path portions from the front side support portions toward the rear side support portions, noise tends to arise. Therefore, it is preferable to make such movements of the axles less likely to occur by the resistance of the springs.

If a heavy and brand-new raw water container is placed on the drawer with the axles located at the respective front side support portions, so that the axles are easily moved to the rear side support portions, though it is possible to prevent the casing from toppling down, it is not sufficient for stably supporting the drawer. Therefore, it is preferable that the axles are kept in the respective front side support portions. The larger the spring constant of the springs is, the less likely the axles are to be moved toward the rear side support portions when the casters collide against a carpet in the sliding-out direction. It is preferable that the axles are to be moved only in the vicinities of the front side support portions.

Specifically, it is preferable that the front side portion and the path portion are connected to each other through a movement resistance area which gradually descends toward the path portion. When the axle comes into contact with the movement resistance area of the bearing surface, since a horizontal component arises so as to push the axle toward the front side support portion, the axle is less likely to escape from the front side support portion. The lower the height of the lowest position of the movement resistance area is, the less likely the axle is to be smoothly moved toward the rear side support portion when the caster collides against the edge of a carpet in the sliding-out direction. By providing the movement resistance area in addition to the spring, it is possible to avoid making low the height of the lowest position P of the movement resistance area, to avoid increasing the spring constant of the spring, and to make the axle appropriately move.

In view of the diameter of the axle suitable for supporting the front side of the drawer when the raw water container is placed on the drawer, in order to enable the axle to be appropriately moved, it is preferable that the height of the axle when the axle is at the front side support portion is different from the height of the axle when the axle is at the lowest position of the movement resistance area such that the difference between the two heights is 30% or below, preferably 20% or below of the diameter of the axle.

Since a carpet which is used in ordinary homes has a thickness of about 10 mm, the casters can compress the carpet to some extent. In view of this point, if the height of the axle when the axle is at the rear side support portion is different from the height of the axle when the axle is at the front side support portion such that the difference between the two heights is 10 mm or over, the water dispenser can be used in ordinary homes even if there is a carpet.

As described above, according to the present invention, when the raw water container is moved into and out of the lower portion of the casing, it is not necessary for the user to determine the sliding directions of the drawer on which the raw water container is placed. Furthermore, when a heavy and brand-new raw water container is placed on the drawer, it is possible to prevent the drawer from freely moving, and to make the casters support the front side of the drawer so as to avoid damaging the floor surface and prevent the casing from toppling down. Therefore, the water dispenser can be used even if there is a carpet without the casters being adjusted by the user, and is excellent in that the drawer can be smoothly slid into and out of the casing.

DETAILED DESCRIPTION OF THE INVENTION

Figure 1:
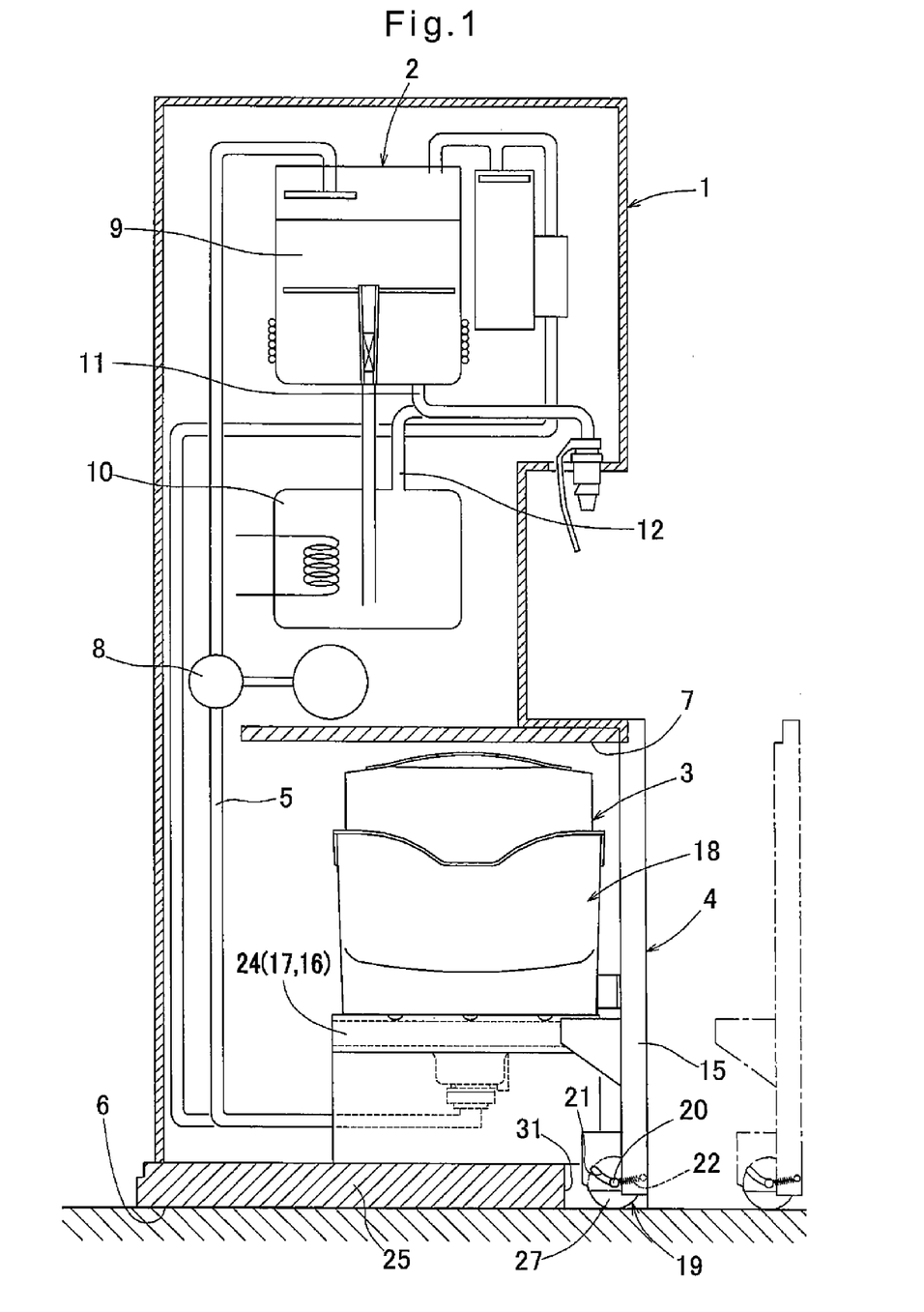
FIG. 1 is a longitudinal sectional front view of an entire water dispenser according to a first embodiment of the present invention.

FIG. 1 illustrates a water dispenser according to the first embodiment of the present invention. This water dispenser includes a casing 1, a temperature adjustment tank 2 arranged inside of the casing 1, a drawer 4 configured to be slid into and out of the lower portion of the casing 1 with a replaceable raw water container 3 placed on the drawer 4, and a raw water supply line 5 through which the raw water container 3 placed on the drawer 4 and the temperature adjustment tank 2 are connected together.

The casing 1 includes an outer bottom surface 6 which enables the casing 1 to stand on a horizontal surface. Normally, the casing 1 stands on a floor surface. The casing 1 is elongated in the vertical direction, which is the direction perpendicular to the outer bottom surface 6. The lower portion of the casing 1 means the lower half of the casing 1. A drawer receiving portion 7 for storing the raw water container 3 and the drawer 4 is provided in the lower portion of the casing 1.

The temperature adjustment tank 2 can temporarily store drinking water drawn up from the raw water container 3 by a pump 8 provided in the raw water supply line 5 and supplied through the raw water supply line 5 to the tank 2, and has at least one of two functions, namely the function for cooling the stored drinking water and the function for heating the stored drinking water.

For example, the temperature adjustment tank 2 includes a cold water tank portion 9 in which drinking water can be cooled by heat exchange, and a warm water tank portion 10 which is provided separately from the cold water tank portion 9 and in which drinking water can be heated by a heater. The cold water tank portion 9 has a cold water discharge line 11 connected thereto through which low-temperature drinking water stored in the lower portion of the tank portion 9 is discharged outside. The warm water tank portion 10 has a warm water discharge line 12 connected thereto through which high-temperature drinking water stored in the upper portion of the tank portion 10 is discharged outside. Each of the cold water discharge line 11 and the warm water discharge line 12 has a cock mounted thereto which is operable from the outside of the casing 1. By opening the respective cocks, drinking water stored in the cold water tank portion 9 and in the warm water tank portion 10 can be discharged into a cup, etc. Drinking water is fed into the upper portion of the cold water tank portion 9 through the raw water supply line 5. When drinking water is discharged from the warm water tank portion 10, drinking water equal in amount to the discharged drinking water is discharged from the upper portion of the cold water tank portion 9 into the warm water tank portion 10. The volume of the cold water tank portion 9 is smaller than the volume of the raw water container 3, and is generally about 2 to 4 liters. The volume of the warm water tank portion 10 is generally about 1 to 2 liters.

Figure 2:
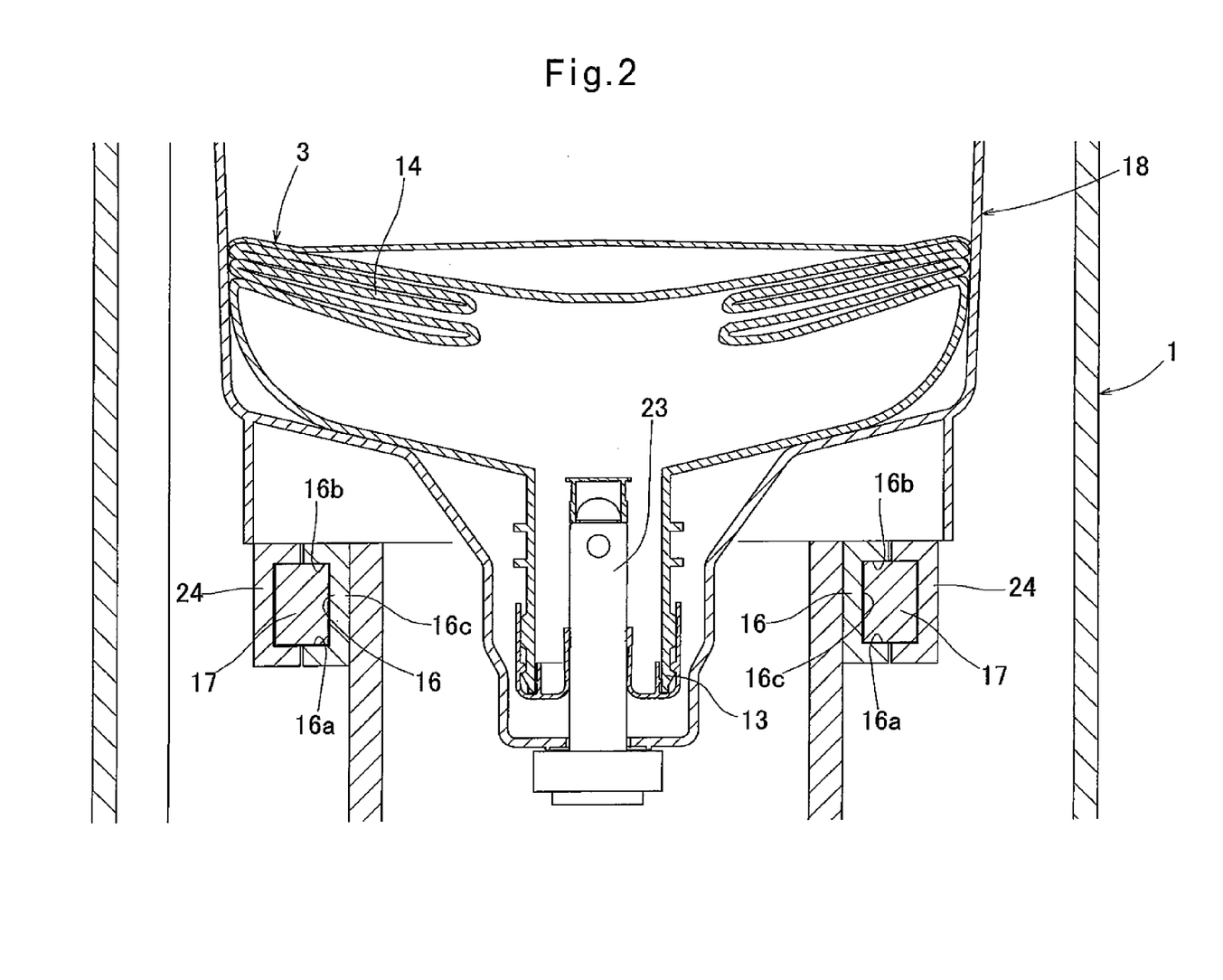
FIG. 2 is an enlarged longitudinal sectional side view of a container holding portion illustrated in FIG. 1 and the vicinity of the container holding portion.

As illustrated in FIGS. 1 and 2, the raw water container 3 is placed on the drawer 4 with a water outlet 13 directed downwardly. A trunk portion 14 of the raw water container 3 is flexibly formed to shrink as the amount of water remaining in the container 3 decreases. The raw water container 3 may be formed by blow molding of, for example, polyethylene terephthalate (PET) resin or polyethylene (PE) resin. Before use, the raw water container 3 is filled with drinking water, and has a volume of about 8 to 20 liters. The water dispenser is configured such that when drinking water has been discharged from the raw water container 3 until no more drinking water can be discharged from the container 3, the container 3 contains very little drinking water inside thereof. In order to enable the pump to draw up water in the raw water container 3 after the raw water container 3 becomes unshrinkable any further, the container 3 has an air intake line connected thereto through which the container 3 communicates with the atmosphere.

As illustrated in FIGS. 1 and 3 to 5, the drawer 4 is slid into and out of the drawer receiving portion 7 of the casing 1 in a straight line in opposite horizontal directions corresponding to the left and right directions in the figures. Hereinafter, these horizontal directions are simply referred to as "sliding-in and sliding-out directions". In particular, the direction in which the drawer 4 is slid out of the drawer receiving portion 7 is referred to as the "sliding-out direction", and the direction in which the drawer 4 is slid into the drawer receiving portion 7 is referred to as the "sliding-in direction".

The drawer 4 includes a panel portion 15 covering the front side of the drawer receiving portion 7, and guiding portions 16 fixed in position in the drawer receiving portion 7 of the casing 1. The drawer 4 is guided in the sliding-in and sliding-out directions by the panel portion 15 and the guiding portions 16. The drawer 4 further includes vertically supported guided portions 17, a container holding portion 18 through which the panel portion 15 and the guided portions 17 are joined together, casters 19 mounted to the front side of the drawer 4, bearing surfaces 21 which receive axles 20 of the respective casters 19, and springs 22 attached to the respective axles 20 and the panel portion 15. Regarding the drawer 4, which is slidable in the sliding-in and sliding-out directions relative to the guiding portions 16 fixed to the casing 1, the front side of the drawer 4 refers to the front half of the drawer 4 with respect to the sliding-out direction (i.e. right half of the drawer 4 in the figures), and the rear side of the drawer 4 refers to the other half of the drawer 4 (i.e. left half of the drawer 4 in the figures).

The container holding portion 18 includes a joint 23 configured to be detachably connected to the water outlet 13 when the raw water container 3 is placed onto the container holding portion 18 from above, and receiving portions 24 which are combined with the respective guided portions 17 such that the receiving portions 24 and the guided portions 17 are movable in the sliding-in and sliding-out directions relative to each other.

The joint 23 forms a leading end portion of the raw water supply line 5. As illustrated in FIG. 2, the joint 23 is configured to penetrate the cap of the water outlet 13, thereby forming an opining in the water outlet 13 such that the inner periphery of this opening and the outer periphery of the joint 23 are kept in close contact with each other. The container holding portion 18 is configured to hold the raw water container 3 such that this close contact is maintained.

As illustrated in FIGS. 1 and 3 to 5, since the guiding portions 16, which are stationary relative to the casing 1, come into contact with the drawer 4 so as to guide the drawer 4 in the sliding-in and sliding-out directions and determine the support height of the drawer 4, the guiding portions 16 are called "contactable areas". The guiding portions 16 shown are a pair of groove-shaped rail portions which extend in the sliding-in and sliding-out directions, and which are opposed to each other in the horizontal direction perpendicular to the sliding-in and sliding-out directions. The guiding portions 16 are each fixed to a supporting plate portion extending vertically from a bottom portion 25 of the casing 1. Since the guided portions 17 are guided and supported by the respective guiding portions 16, the guided portions 17 are also called "contactable areas". Each of the guided portions 17 shown is located in the rearmost portion of the drawer 4, and is a rod portion fitted between the guiding portion 16 and the receiving portion 24 such that slight gaps are formed between the rail inner surface of the guiding portion 16 and the guided portion 17 and between the rail inner surface of the receiving portion 24 and the guided portion 17. The receiving portions 24 are groove-shaped rail portions extending in the sliding-in and sliding-out directions, and arranged so as to be opposed to the rail inner surfaces of the respective guiding portions 16.

Figure 3:
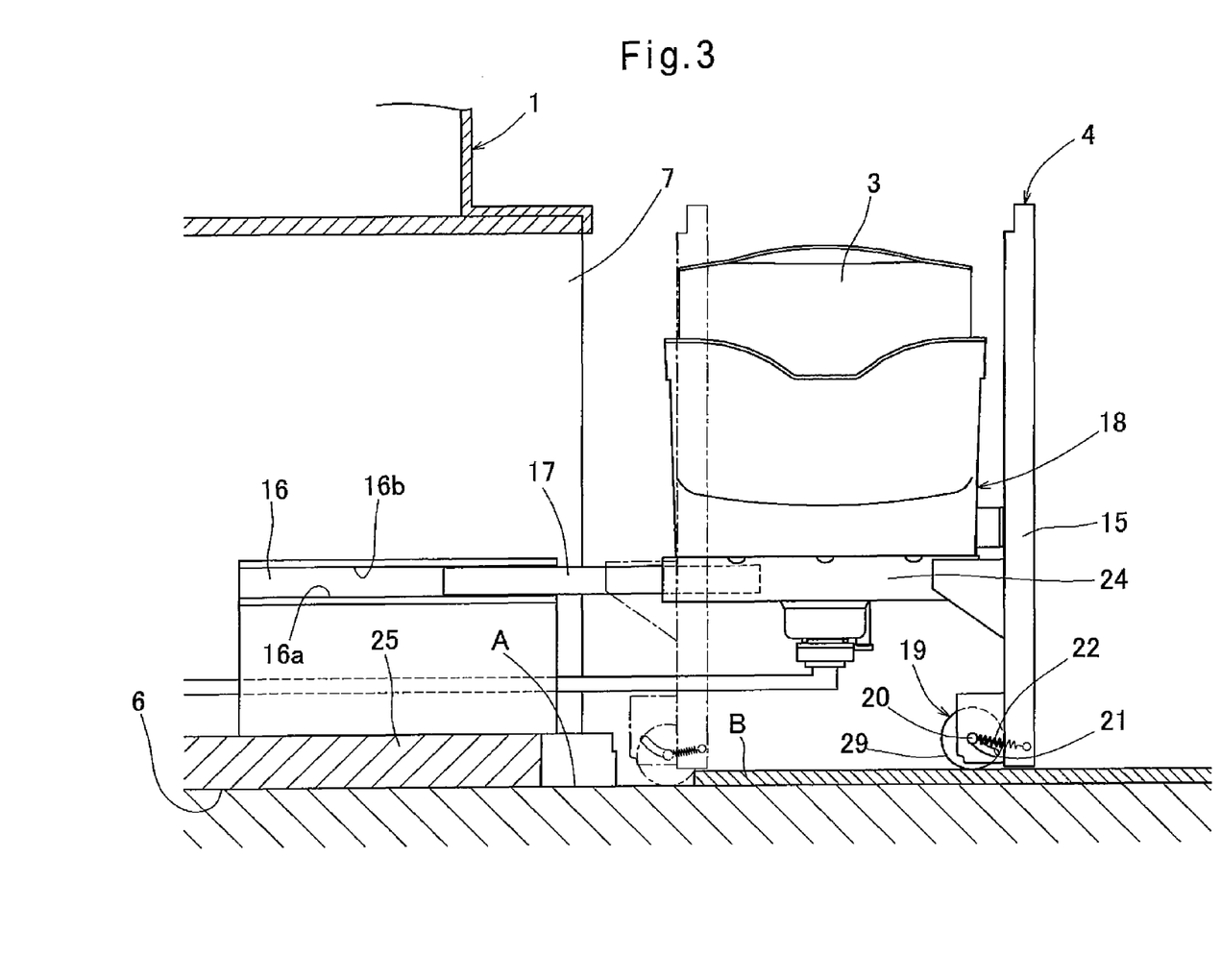
FIG. 3 is a longitudinal sectional front view illustrating a state in which a carpet is placed on a floor surface in front of a casing illustrated in FIG. 1, and in which a drawer is slid in a sliding-out direction to such an extent that the drawer is no longer slidable in the sliding-out direction.
Figure 4:
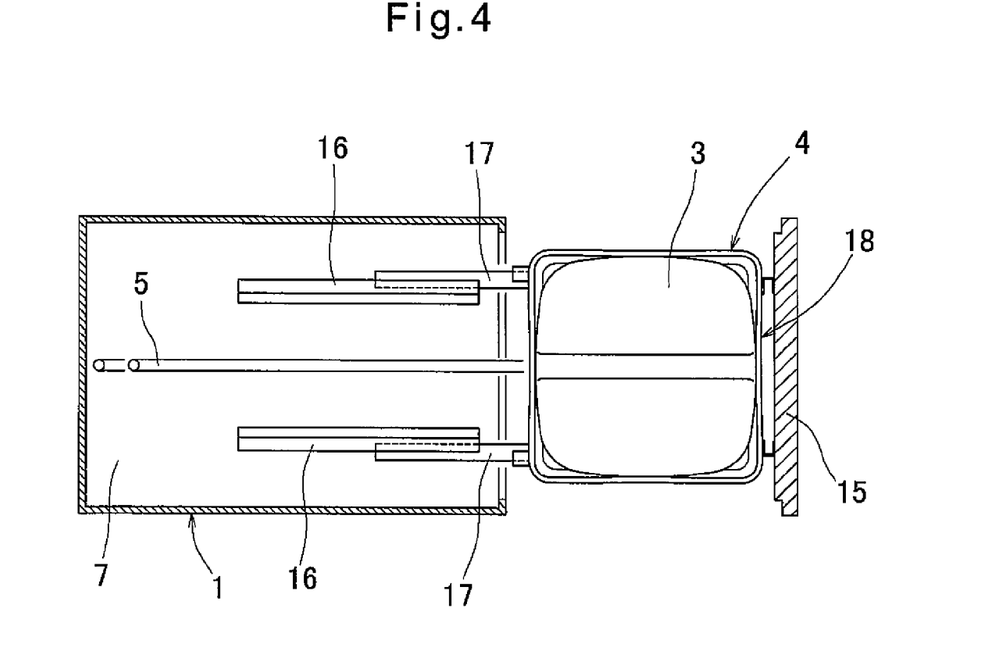
FIG. 4 is a cross-sectional view of a water dispenser illustrated in FIG. 3.
Figure 5:
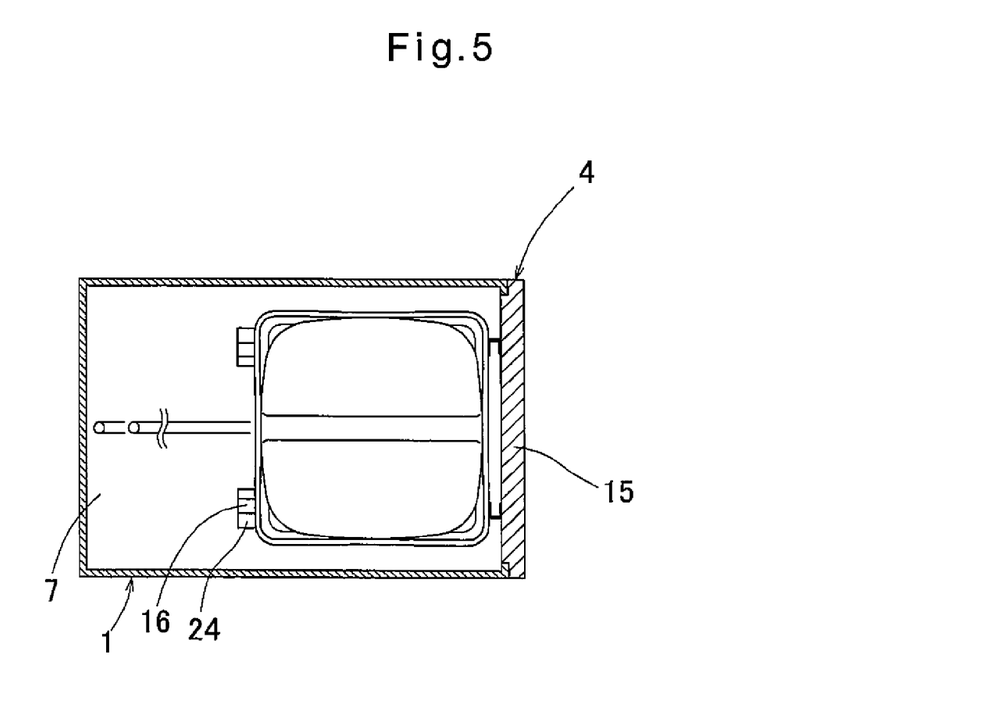
FIG. 5 is a cross-sectional view of the water dispenser illustrated in FIG. 1.

The drawer 4 is slidable in the sliding-out direction out of the storage position in which the panel portion 15 and the casing 1 abut each other in the sliding-in direction. The user grips the panel portion 15, and slides the drawer 4 into or out of the casing 1. When the drawer 4 is in the storage position, the entire guided portions 17 are each fitted between the guiding portion 16 and the receiving portion 24. When the drawer 4 is slid out of the storage position in the sliding-out direction, the guided portions 17 are slid in the sliding-out direction relative to the respective guiding portions 16, while the receiving portions 24 are slid in the sliding-out direction relative to the respective guided portions 17. Each of the guided portions 17 is not detachable from the receiving portion 24 and the guiding portion 16 as long as a special disassembling is not conducted. FIGS. 3 and 4 illustrate a state in which the drawer 4 has been slid in the sliding-out direction to the limit, namely a state in which the guided portions 17 have been slid in the sliding-out direction, relative to the respective guiding portions 16, to the limit, and the receiving portions 24 have been slid in the sliding-out direction, relative to the respective guided portions 17, to the limit. When the drawer 4 is slid from any position in the sliding-in direction to the storage position, the entire guided portions 17 are each fitted (received) between the guiding portion 16 and the receiving portion 24. The receiving portions 24 and the guided portions 17 are designed to be slidable in the sliding-in and sliding-out directions relative to each other for the purpose of enabling a brand-new raw water container 3 to be placed onto the container holding portion 18 from right over the container holding portion 18.

As illustrated in FIGS. 2 and 3, each of the guided portions 17 is always vertically supported by a lower side guide surface 16a and an upper side guide surface 16b which extend in the sliding-in and sliding-out directions, and is further restricted by both the guide surfaces 16a, 16b and a lateral side guide surface 16c through which the guide surfaces 16a and 16b are joined together and which extends in the sliding-in and sliding-out directions, thereby enabling the guided portions 17 to be guided in the sliding-in and sliding-out directions. Since the guided portions 17 are vertically supported and slidably guided by the respective receiving portions 24 in the same manner as the guided portions 17 are vertically supported and slidably guided by the respective guiding portions 16, the drawer 4 is accurately and reliably guided and supported by the guiding portions 16. The support height of the drawer 4 is determined by the lower side guide surfaces 16a of the respective guiding portions 16, and is predetermined such that the raw water supply line 5, which is attached to the bottom of the container holding portion 18, does not come into contact with the floor surface A when the drawer 4 is slid in the sliding-out direction to the limit.

Figure 6:
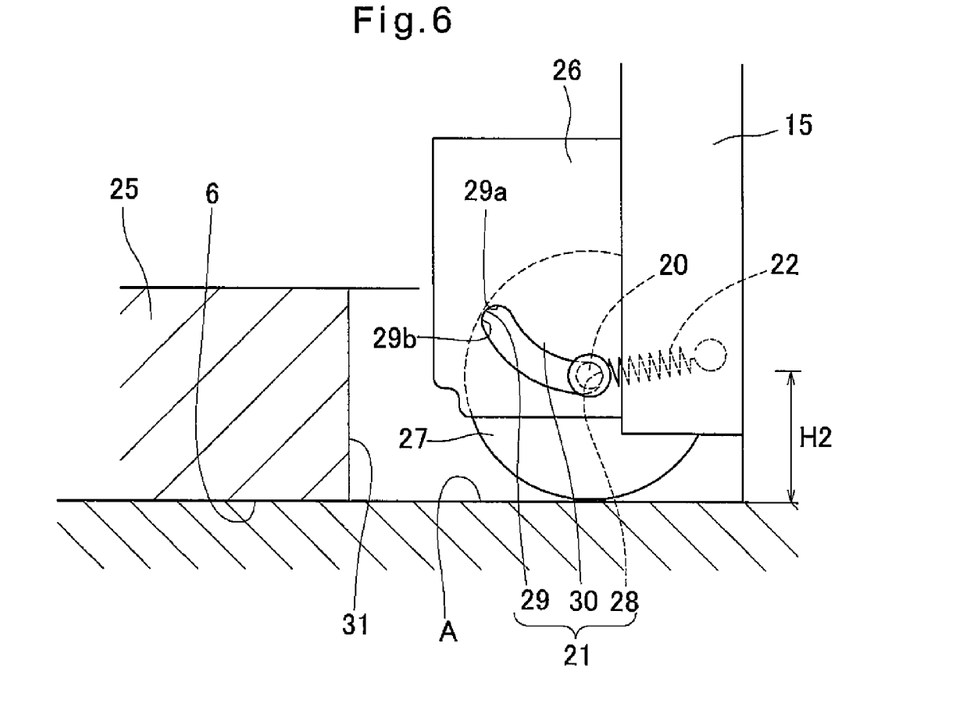
FIG. 6 is an enlarged view of a caster illustrated in FIG. 1.
Figure 7:
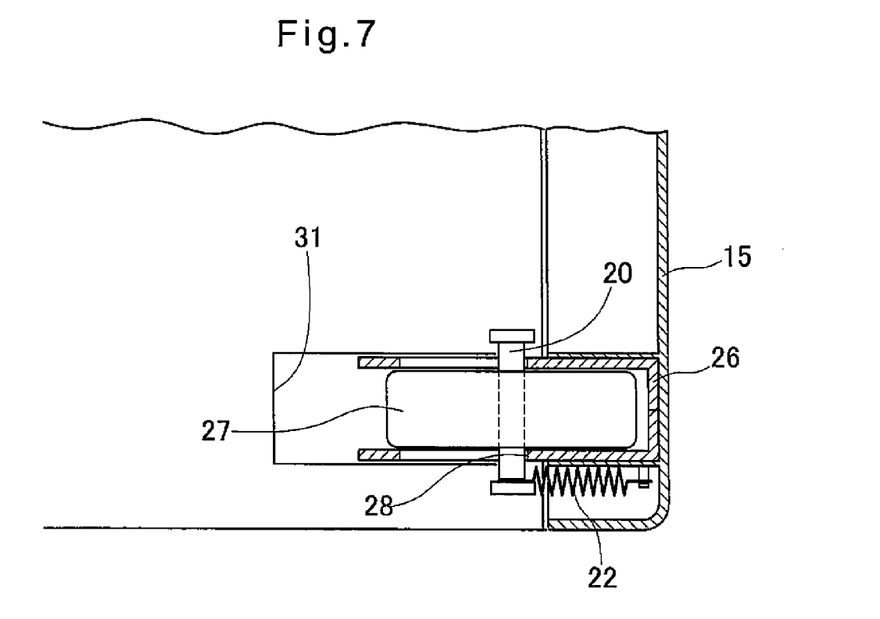
FIG. 7 is an enlarged cross-sectional view of the caster illustrated in FIG. 1.

The length of the drawer 4 shown in the sliding-in and sliding-out directions, which is determined by the panel portion 15 and the guided portions 17, changes when the receiving portions 24 and the guided portions 17 are slid relative to each other. As illustrated in FIGS. 1, 6 and 7, bearing frames 26 to which the respective casters 19 are attached are provided on the back surface of the panel portion 15, which is always located at the front side of the drawer 4. Each bearing frame 26 has shaft holes each formed with one of the bearing surfaces 21 on the inner periphery thereof. Each of the casters 19 includes the axle 20, and a wheel portion 27 which rotates about this axle 20. The axle 20 is loosely fitted in the shaft holes, which extend through the bearing frame 26, and thus is slidable on the respective bearing surfaces 21. The axle 20 has anti-pullout features at the respective ends thereof which prevent the axle 20 from being pulled out of either of the shaft holes. One of the anti-pullout features is integral with the axle 20, while the other of the anti-pullout features is a separate member from the axle 20 and mounted to the axle 20. Each caster 19 is attached to the drawer 4 by inserting the axle 20 in the bearing holes of the corresponding bearing frame 26, and then by mounting the separate (anti-pull-out) member to the axle 20.

Figure 8:
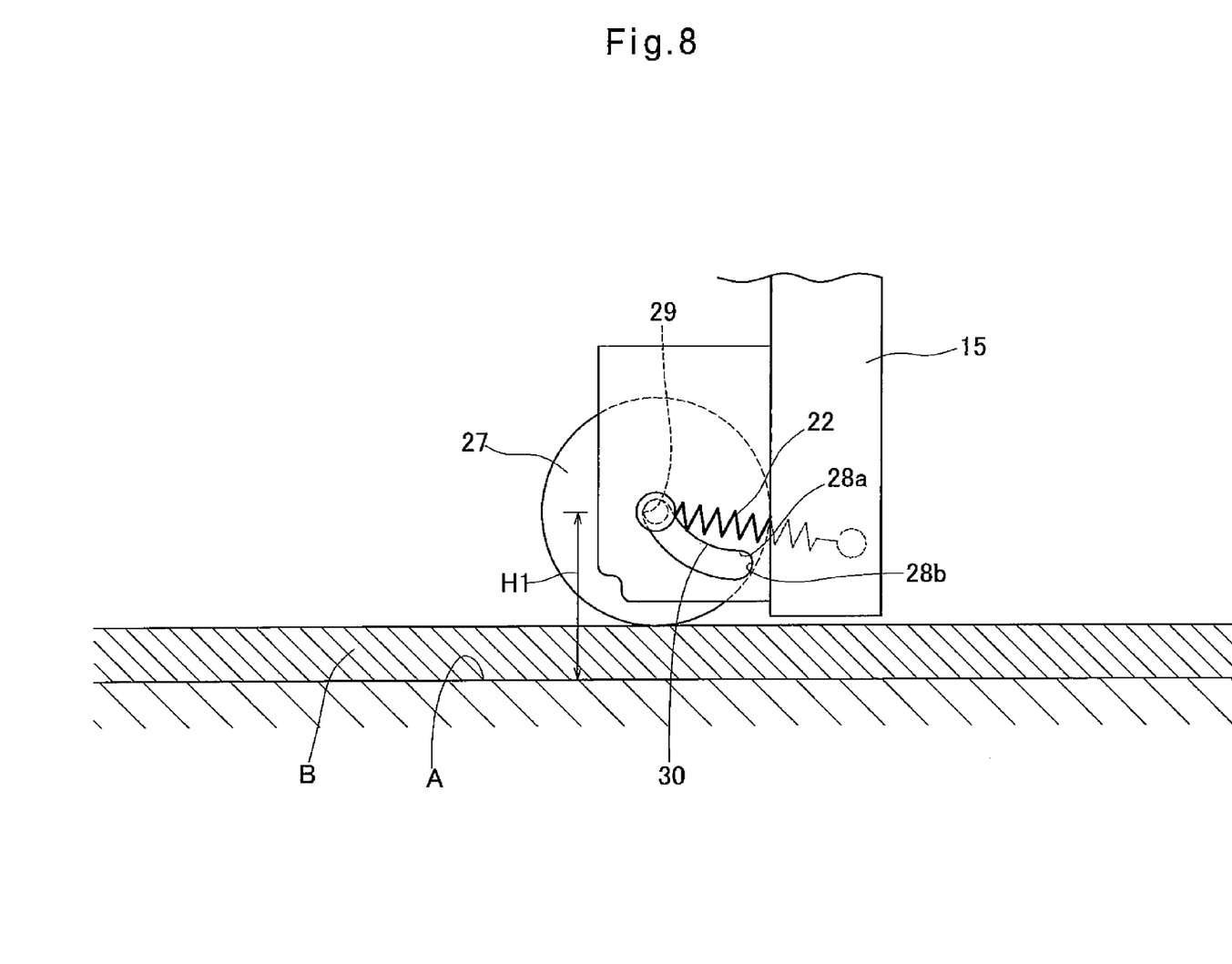
FIG. 8 is an enlarged view of a caster illustrated in FIG. 3.

As illustrated in FIGS. 1, 6, and 8, each of the bearing surfaces 21 includes a front side support portion 28 which supports the axle 20 on the front side of the surface 21, a rear side support portion 29 which supports the axle 20 on the rear side of the surface 21, and a path portion 30 along which the axle 20 is guided to the rear side support portion 29 from the front side support portion 28. The front side support portion 28 extends from a position 28a to a portion 28b. The position 28a is a position with which the portion of the axle 20 over the center axis of the axle 20 comes in contact, with the lowest portion of the wheel portion 27 of the caster 19 located at the same height as the outer bottom surface 6 of the casing 1. The position 28b is the frontmost position, with respect to the sliding-out direction, of the bearing surface 21 with which the axle 20 can contact the bearing surface 21. The rear side support portion 29 extends from a position 29a to a position 29b. The position 29a is the highest position of the bearing surface 21 with which the portion of the axle 20 over the axis of the axle 20 can contact the bearing surface 21. The position 29b is the rearmost position, with respect to the sliding-in direction, of the bearing surface 21 with which the axle 20 can contact the bearing surface 21. The path portion 30 is a contactable area through which the axle 20 is movable only between the front side support portion 28 and the rear side support portion 29. Since the vicinity of the position 28a illustrated in the figures receives vertical loads of the bearing frame 26, the vicinity thereof is made substantially a horizontal portion, while the vicinity of the position 28b is made circular arc-shaped to extend along the axle 20. The portion from the position 29a to the position 29b illustrated in the figures is made circular arc-shaped to extend along the axle 20. The path portion 30 shown gradually ascends in the sliding-in direction, i.e. from the front side support portion 28 toward the rear side of the bearing surface 21.

As illustrated in FIGS. 1 and 6, when the axle 20 is supported on the front side support portion 28, the lowest portion of the wheel portion 27 of the caster 19 is located at the same height as the outer bottom surface 6 of the casing 1. As illustrated in FIGS. 3 and 8, when the axle 20 is supported on the rear side support portion 29, the lowest portion of the wheel portion 27 of the caster 19 is located higher than the outer bottom surface 6 of the casing 1. Irrespective of whether the axles 20 are at the front side support portion 28 or at the rear side support portion 29, the other members of the drawer 4, such as the panel 15, are always located higher than the outer bottom surface 6.

There is a difference of 10 mm or over between height H1 of the axle 20 when the axle 20 is at the rear side support portion 29, see FIG. 8, and height H2 of the axle 20 when the axle 20 is at the front side support portion 28, see FIG. 6. The height H1 is the height between the horizontal plane containing the outer bottom surface 6 and the center axis of the axle 20 when the axle 20 is at the rear side support portion 29. The height H2 is the height between the horizontal plane containing the outer bottom surface 6 and the center axis of the axle 20 when the axle 20 is at the front side support portion 28. Therefore, as illustrated in FIGS. 1 and 3, the difference between the heights H1 and H2, namely H1 minus H2 corresponds to the range in which the axle 20 is movable in the vertical direction, and the range in which the caster 19 is movable in the vertical direction.

The support height of the entire drawer 4 in the vertical direction is determined by the guiding portions 16, the guided portions 17, and the receiving portions 24 irrespective of whether the drawer 4 is in the storage position or the drawer 4 is slid in the sliding-out direction to the limit. Therefore, the casters 19 normally do not need to support the combined weight of the drawer 4 and the raw water container 3. When the drawer 4 is in the storage position in particular, since each of the entire guided portions 17 is substantially fitted (received) between the guiding portion 16 and the receiving portion 24, and the front side of the drawer 4 is also supported by the guiding portions 16, the casters 19 do not substantially support the drawer 4. Therefore, the bottom portion 25 of the casing 1 is provided with caster storing portions 31 in the form of cutouts which are open from the outer bottom surface 6 toward the front side of the bottom portion 25, thereby enabling the casters 19 to be stored in the respective caster storing portions 31 such that the casters 19 are located at the same height as the outer bottom surface 6.

As illustrated in FIGS. 6 and 7, each of the springs 22 is a coil spring having the front end thereof attached to the panel portion 15, and the rear end thereof attached to the axle 20. When the axle 20 is supported on the front side support portion 28, a moderate tension is applied to the spring 22. This moderate tension is a slight tension which enables the axle 20 to be stationary (stable) in the vicinity of the front side support portion 28 even if vibration, etc. has occurred, and which also enables the spring 22 to keep its tension even if the spring 22 has been used for a long period of time and thus extended. As the axle 20 is moved through the path portion 30 toward the rear side support portion 29, the spring 22 is pulled more strongly by the axle 20, so that its biasing force increases. In other words, the farther the axle 20 is from the front side support portion 28, the larger the biasing force of the spring 22 that tends to push the axle 20 toward the front side support portion 28. Though the spring 22 is attached onto only one side of the axle 20 in the figures, a similar spring may be also attached onto the other side of the axle 20 so that both sides of the axle 20 are equally biased. Furthermore, the spring 22 is not limited to a spring which pulls the axle 20, but may be a spring which is attached onto the other side of the axle 20 and which pushes the axle 20 so as to have the same biasing effect as the spring pulling the axle 20.

As illustrated in FIGS. 1 and 6, when the axles 20 are supported on the respective front side support portions 28, the wheel portions 27 of the casters 19 roll on the floor surface A, with which the outer bottom surface 6 of the casing 1 is kept in contact, with the front side of the drawer 4 supported on the floor surface A through the casters 19. If the raw water container 3 is gently placed onto the container holding portion 18 from above, even though the axles 20 are pushed from above and the pushing force is applied to the axles 20 that tends to slide the axles 20 through the path portions 30 toward the rear side support portions 29, the axles 20 are held at the front side support portions due to the resistance of the springs 22. Since the casters 19, together with the guiding portions 16, vertically support the drawer 4, a load applied to the guiding portions 16 is made light. If the raw water container 3 is roughly placed onto the container holding portion 18, the axles 20 may be moved through the path portions 30 toward the rear side support portions 29 against the biasing force of the springs 22 due to the temporary deformation of the guided portions 17 of the drawer 4, a relative tilt between the guided portions 17, the guiding portions 16, and the receiving portions 24, or the tilt of the casing 1 toward the front side of the casing 1. Even in such a situation, however, since the axles 20 reach the rear side support portions 29 before the panel portion 15 comes into contact with the floor surface A, the front side of the drawer 4 is supported. Therefore, the casing 1 never topples down, and the panel portion 15 never damages the floor surface A.

Even if there is a difference in height on the path along which the wheel portion 27 of each caster 19 rolls when the drawer 4 is slid from the storage position in the sliding-out direction to the limit, if such a difference in height is within the range of the height difference H1 minus H2 as illustrated in FIGS. 1, 3, 6, and 8, the axle 20 can be moved through the path portion 30 to the rear side support portion 29 or to the front side support portion 28 so that the caster 19 can roll on the path following the height difference. When the axles 20 are supported on the respective rear side support portions 29, the wheel portions 27 can roll on surfaces higher than the outer bottom surface 6 of the casing 1 with the front side of the drawer 4 supported through the wheel portions 27 on these surfaces.

If a carpet B is placed on the floor surface A in front of the casing 1, the edge of the carpet (also generically referred to as an "object") B forms a step having a height of about 10 mm relative to the floor surface A. When the drawer 4, located in the storage position, is slid out of the drawer receiving portion 7, the wheel portions 27 of the casters 19 collide against the edge of the carpet B in the sliding-out direction (right direction in the figures), with the axles 20 supported on the respective front side support portions 28. The force of this collision is transmitted to the axles 20, so that the axles 20 are moved through the path portions 30 from the front side support portions 28 toward the rear side support portions 29. On the other hand, while the drawer 4 is being moved toward the storage position, when the wheel portions 27 land onto the floor surface A from the carpet B or if one of the wheel portions 27 fall into a recess of the carpet B, the corresponding axle or axles 20 are moved toward the front side support portions 28 by the springs 22, which now have a larger biasing force.

While the axles 20 are supported on the respective rear side support portions 29, the wheel portions 27 can roll on the carpet B while compressing the carpet B to some extent. Normally, the height of the edge (i.e. step) of the carpet B does not exceed 10 mm. However, if the height difference H1 minus H2 is 10 mm or over, the wheel portions 27 can be rolled onto a carpet B having a height which slightly exceeds 10 mm, thus making the water dispenser practical enough to be provided to ordinary homes.

When the raw water container 3 is placed onto the container holding portion 18 from over the portion 18 with the wheel portions 27 located on the carpet B, the axles 20 are located at the rear side support portions 29 or at the path portions 30. When the axles 20 are supported on the respective rear side support portions 29, even if the raw water container 3 is roughly placed onto the container holding portion 18, the casters 19 can promptly support the front side of the drawer 4 on the floor surface A through the carpet B, thus making it possible to prevent the casing 1 from toppling down. On the other hand, when the axles 20 are located at the path portions 30, it is difficult for the path portions 30 to receive loads in the vertical direction. Therefore, if the raw water container 3 is roughly placed onto the container holding portion 18, the casters 19 can support the front side of the drawer 4 according to the strength of the springs 22, and finally the axles 20 reach the rear side support portions 29 before the casing 1 topples down, thereby enabling the casters 19 to support the front side of the drawer 4.

According to the first embodiment described above, when the drawer 4 is slid into and out of the lower portion of the casing 1 with the raw water container 3 placed on the drawer 4, the sliding directions of the drawer 4 are determined by the support and guidance between the guiding portions 16 and the guided portions 17, and thus are not determined by the user. Also, since the guiding portions 16 are guided in the sliding-in and sliding-out directions, i.e. horizontal directions, it is possible to prevent the drawer 4 from freely moving when a brand-new and heavy raw water container 3 is placed onto the drawer 4. Also, when the drawer 4 is slid in the sliding-out direction, if the wheel portions 27 of the casters 19 come into contact with the carpet B in the sliding-out direction with the axles 20 supported on the respective front side support portion 28, the axles 20 are moved through the path portions 30 from the front side support portions 28 toward the rear side support portions 29, and before the casing 1 topples down and before the front side of the drawer 4 comes into contact with the floor surface A, the axles 20 are supported on the respective front side support portions 28 or at the respective rear side support portions 29, thereby enabling the casters 19 to support the front side of the drawer 4. Therefore, it is possible to prevent the casing 1 from toppling down so as to avoid damaging the floor surface A without the casters 19 being adjusted by the user, thus making the water dispenser excellent in that the drawer 4 can be smoothly slid in the sliding-in and sliding-out directions. Also, since the water dispenser is designed such that the casters 19 can roll on and roll off a carpet B having a height of 10 mm, the water dispenser is suitable for use in ordinary homes.

Figure 9:
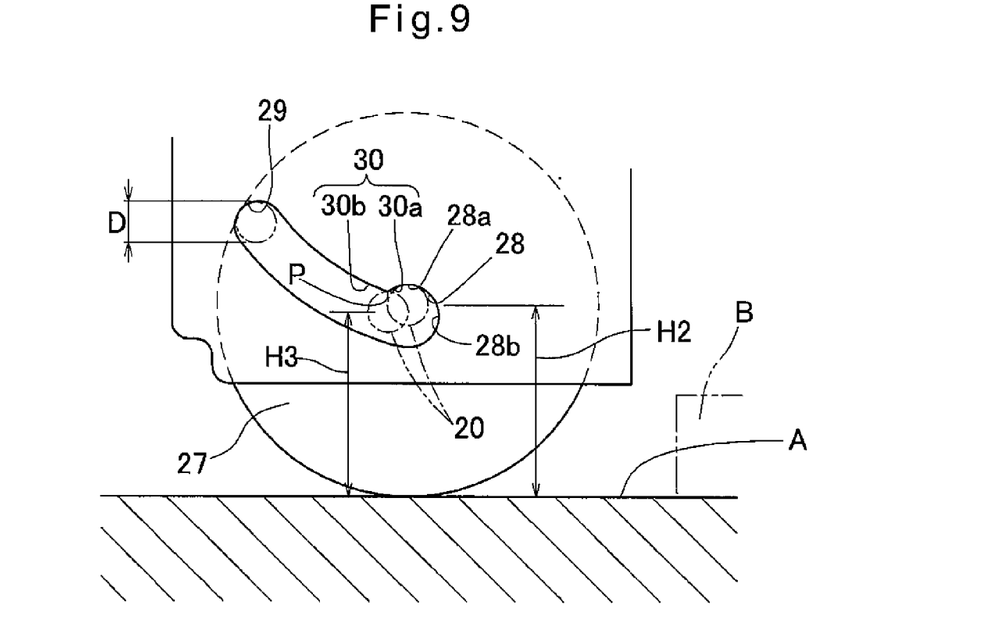
FIG. 9 is a front view of a main portion illustrating a second embodiment of the present invention.

The second embodiment of the present invention is now described. Hereinafter, only points different from the first embodiment are described. As illustrated in FIG. 9, each front side support portion 28 according to the second embodiment continuously extends to be circular arc-shaped from the position 28a to the position 28b. Each path portion 30 is connected to the position 28a which is the rear end of the front side support portion 28 through a movement resistance area 30a which gradually descends toward the rear side support portion 29. The movement resistance area 30a is circular arc-shaped so as to have a curvature and a curvature center which are different from those of the remaining portion 30b (which gradually ascends toward the rear side support portion 29) of the path portion 30. As for height H2 of the axle 20 when the axle 20 is at the front side support portion 28 (when the portion of the axle 20 over the center axis of the axle 20 is kept in contact with the position 28a) and height H3 of the axle 20 when the axle 20 is at the lowest position P of the movement resistance area 30a (when the portion of the axle 20 over the center axis of the axle 20 is kept in contact with the lowest position P), the height difference H2 minus H3 is predetermined to be 20% of the diameter D of the axle 20. The height H3 is the height between the horizontal plane containing the outer bottom surface 6 and the center axis of the axle 20 when the axle 20 is at the lowest position P in which the height of the movement resistance area 30a is the lowest.

When the raw water container 3 is placed on the container holding portion 18 and the axles 20 kept in contact with the respective movement resistance areas 30a are pushed from above, since horizontal component arises so as to push the axles 20 toward the sliding-out direction, the axles 20 are less likely to escape from the front side support portions 28. According to the second embodiment, it is possible to avoid making low the height of the lowest positions P of the respective movement resistance area 30a, and further to avoid increasing the spring constant of the springs 22. Also, since H2-H3 is 30% or below of the diameter D of the axle 20, even if the wheel portions 27 come into contact with the carpet B, the axles 20 are smoothly slid in the respective movement resistance areas 30a, thus enabling the axles 20 to be appropriately moved.

Figure 10:
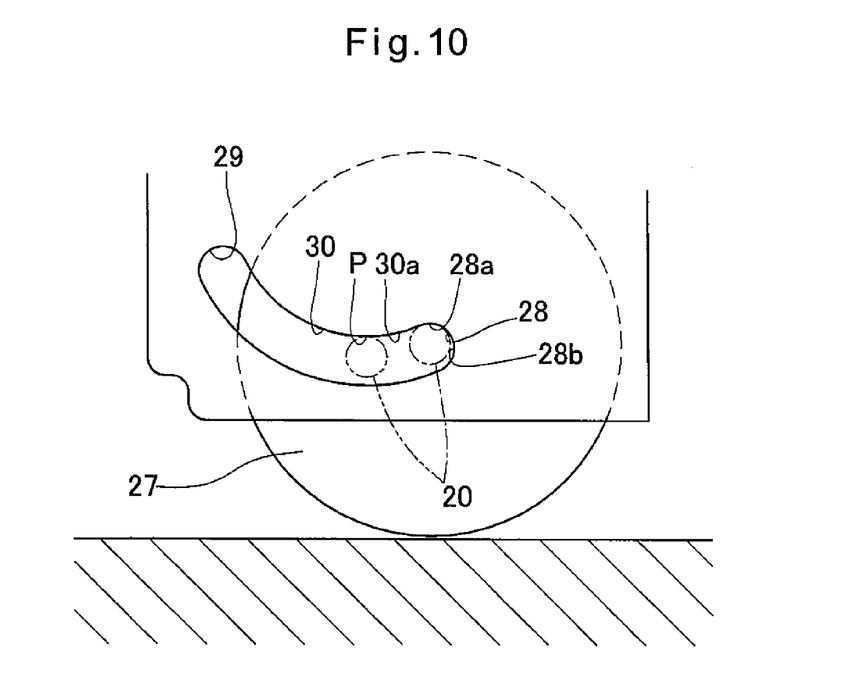
FIG. 10 is a front view of a main portion illustrating a third embodiment of the present invention.

According to the third embodiment illustrated in FIG. 10, each path portion 30 may be formed such that a single circular arc-shaped area including the movement resistance area 30a continuously extends up to the vicinity of the rear side support portion 29. It is possible to apply movement resistance to the axles 20 with each path portion 30 smoothly continuously extending from the position 28a of the front side support portion 28 up to the vicinity of the rear side support portion 29. Unlike the example of FIG. 9, each lowest position P is not formed to draw a ridgeline, thus making it possible to prevent collision sound from arising when the axles 20 pass the respective movement resistance areas 30a.

Figure 11:
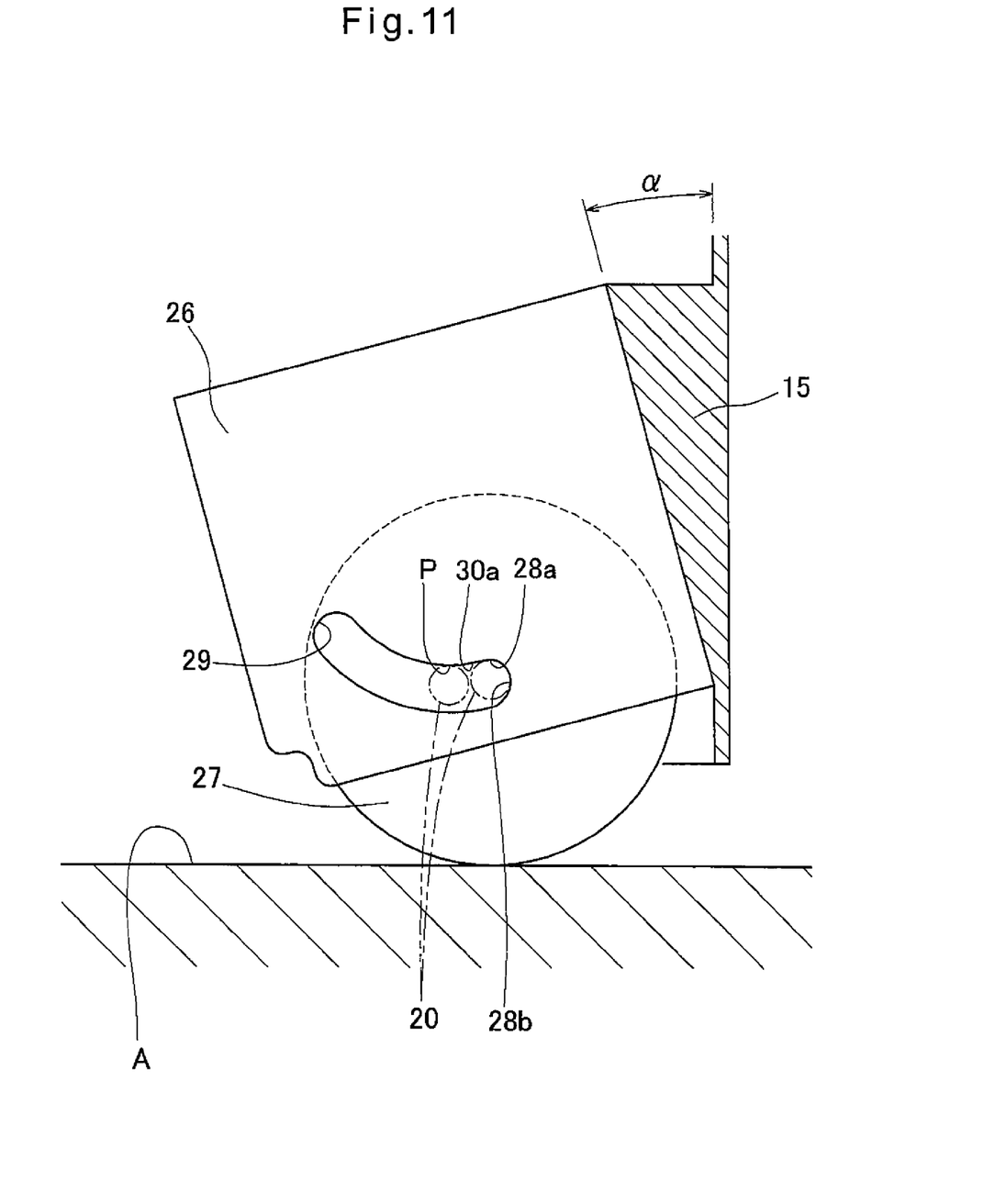
FIG. 11 is a front view of a main portion illustrating a fourth embodiment of the present invention.

According to the fourth embodiment illustrated in FIG. 11, the movement resistance areas 30a may be formed by attaching the respective bearing frames 26 to the panel portion 15 with the upper portions of the bearing frames 26 finally tilted by angle α (alpha) toward the rear side of the respective bearing frames 26. In order to determine an attachment angle (corresponding to angle α) relative to the vertical direction, the bearing frames 26 each includes an attaching surface (surface located on the extended line of the rear side leader line of the angle α illustrated in FIG. 11) which extends along the wall surface of the panel portion 15. Assuming that each position 28a is at the position of 6 o'clock in the clockwise direction, a circular arc-shaped portion is formed from the 6 o'clock position toward the clockwise direction. The 6 o'clock direction is along the attaching surface of each of the bearing frames 26. Therefore, due to the attachment of each of the bearing frames 26 tilted by angle $\alpha$, the normal direction at the position 28a faces the front side of the bearing frame 26, and the normal direction at the lowest position P included in the circular arc-shaped portion faces the vertical direction. As a result thereof, the movement resistance area 30a is formed between the position 28a and the lowest position P. In this case, irrespective of the diameter or the cross-sectional shape of the axle 20, if the angle $\alpha$ is 5 degrees or over, it is possible to apply resistance to the axles 20 so that the axles 20 are held at the respective position 28a. The technical scope of the present invention is not limited to the above-described embodiments, and includes all modifications within the scope of technical ideas based on the scope of the claims.

The invention claimed is:

1. A water dispenser wherein a replaceable raw water container is mounted in a lower portion of a casing, wherein drinking water contained in the raw water container is supplied to a temperature adjustment tank, and wherein drinking water stored in the temperature adjustment tank is discharged, wherein the water dispenser comprises a drawer configured to be slid into and out of the lower portion of the casing with the raw water container placed on the drawer, wherein a rear side of the drawer is guided in sliding-in and sliding-out directions along a horizontal straight line, and supported in a vertical direction by a guiding portion fixed to the casing, wherein a caster is attached to a front side of the drawer, wherein a bearing surface which receives an axle of the caster comprises a front side support portion which supports the axle on a front side of the bearing surface, a rear side support portion which supports the axle on a rear side of the bearing surface, and a path portion along which the axle is guided from the front side support portion to the rear side support portion, and wherein the water dispenser is configured such that:

when the axle is supported on the front side support portion, a lowermost surface of the caster is located at a same height as an outer bottom surface of the casing;

when the axle is supported on the rear side support portion, the lowermost surface of the caster is located higher than the outer bottom surface of the casing; and when the drawer is slid out of the lower portion of the casing, the caster collides against an object in the sliding-out direction so that the axle is moved from the front side support portion to the rear side support portion.

2. The water dispenser according to claim 1, comprising a spring configured to bias the axle toward the front side support portion while the axle is located at the path portion or the rear side support portion.

3. The water dispenser according to claim 2, wherein a height of the axle when the axle is at the rear side support portion is different from a height of the axle when the axle is at the front side support portion such that the difference between the two heights is 10 mm or over.

4. The water dispenser according to claim 2, wherein the front side support portion and the path portion are connected to each other through a movement resistance area which gradually descends toward the path portion.

5. The water dispenser according to claim 4, wherein a height of the axle when the axle is at the rear side support portion is different from a height of the axle when the axle is at the front side support portion such that the difference between the two heights is 10 mm or over.

6. The water dispenser according to claim 4, wherein a height of the axle when the axle is at the front side support portion is different from a height of the axle when the axle is at a lowest position of the movement resistance area such that the difference between the two heights is less than or equal to 30% of a diameter of the axle.

7. The water dispenser according to claim 6, wherein a height of the axle when the axle is at the rear side support portion is different from a height of the axle when the axle is at the front side support portion such that the difference between the two heights is 10 mm or over.

8. The water dispenser according to claim 1, wherein a height of the axle when the axle is at the rear side support portion is different from a height of the axle when the axle is at the front side support portion such that the difference between the two heights is 10 mm or over.

* * * * *